Jan. 5, 1937. S. B. WARD 2,066,752
RUBBER COVERED ROLL AND METHOD OF MAKING THE SAME
Filed Aug. 8, 1935 2 Sheets-Sheet 1
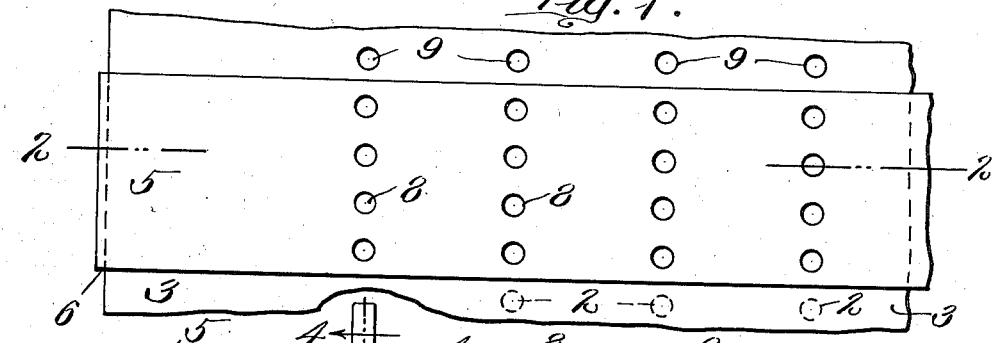
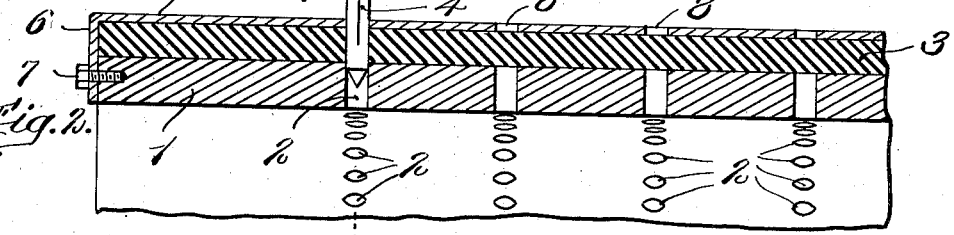
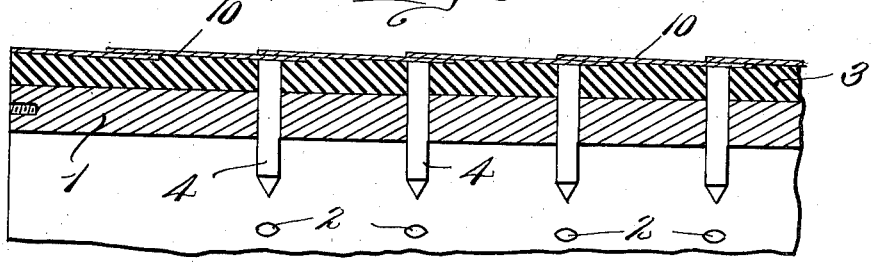
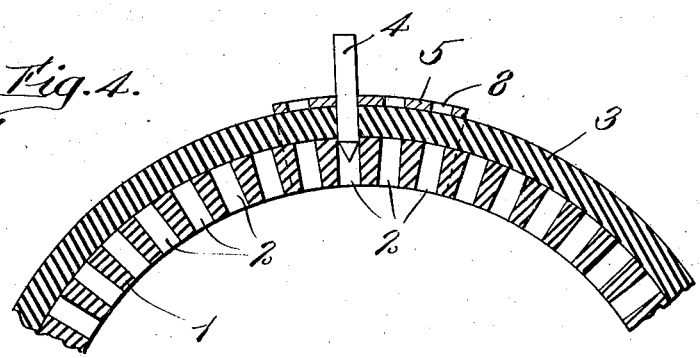
Inventor.
Sherman B. Ward,
by George A. Rockwell,
atty.

Jan. 5, 1937.  S. B. WARD  2,066,752
RUBBER COVERED ROLL AND METHOD OF MAKING THE SAME
Filed Aug. 8, 1935  2 Sheets-Sheet 2
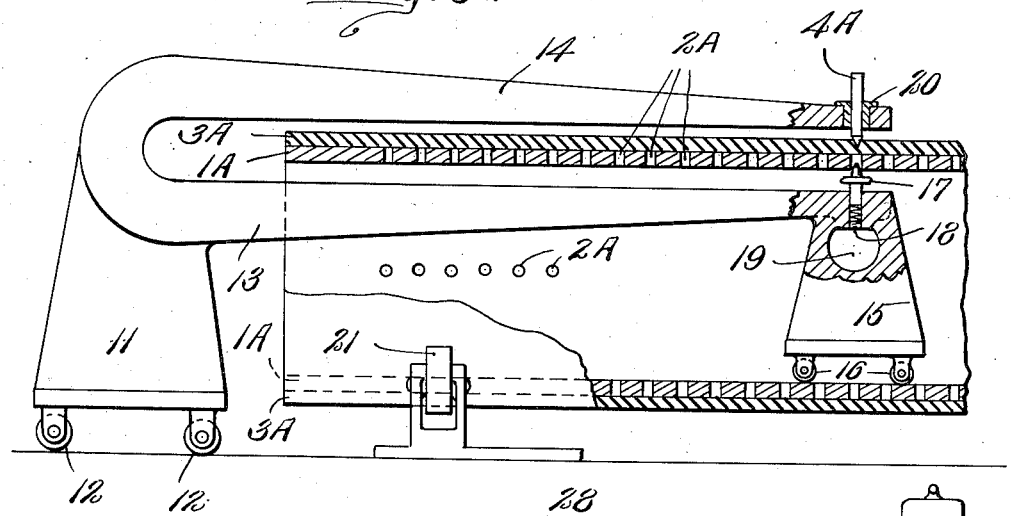
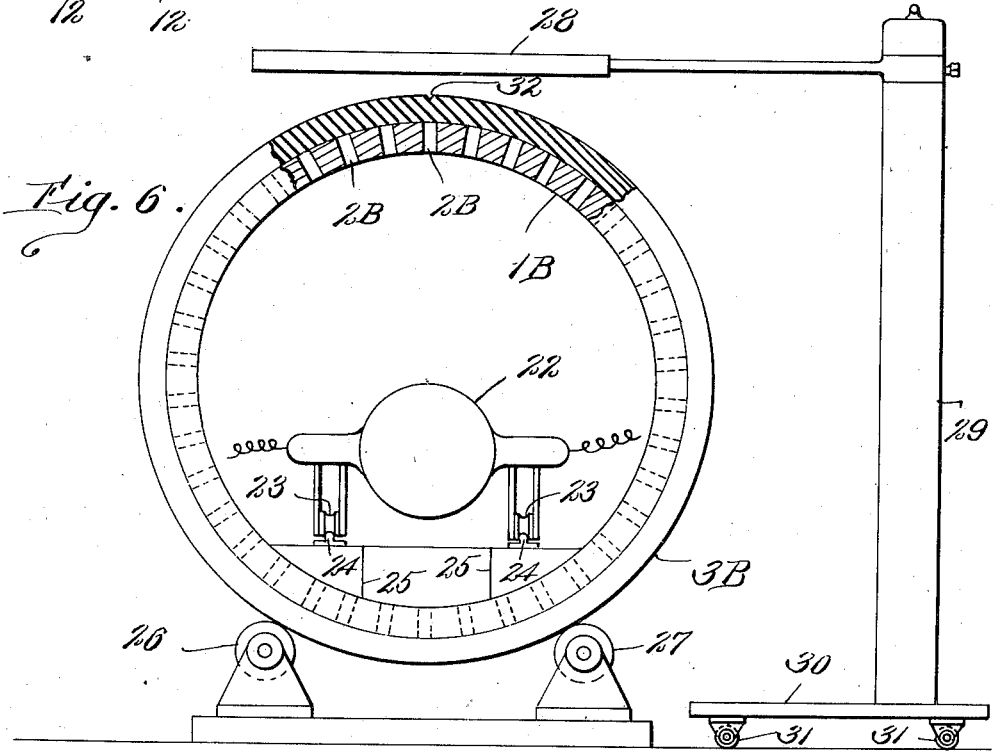
Inventor.
Sherman B. Ward,
by George A. Rockwell
Atty.

Patented Jan. 5, 1937

2,066,752

UNITED STATES PATENT OFFICE 2,066,752

RUBBER COVERED ROLL AND METHOD OF MAKING THE SAME

Sherman B. Ward, Portsmouth, N. H., assignor to Stowe-Woodward, Inc., Newton Upper Falls, Mass., a corporation of Massachusetts Application August 8, 1935, Serial No. 35,342

7 Claims. (Cl. 92—53)

My invention relates to rolls covered with rubber or equivalent material and especially suction press rolls for paper making machinery, in which the roll itself, preferably of metal, such as bronze, is provided with a plurality of holes or perforations and the rubber covering is also provided with holes or perforations, the latter being respectively in registry with the perforations in the roll. It has been proposed to drill the holes or perforations in the rubber covering after the latter has been vulcanized but this procedure is expensive and is frequently inaccurate. It has also been proposed to drive pegs or pins through the rubber covering from the inside of the roll itself but this is objectionable because of the difficulty of getting proper access to the pegs at the inside of a roll, especially if the roll is of small diameter, and also objectionable because such outward driving tends to force the rubber covering away from, rather than toward, the roll itself.

My invention overcomes the above-mentioned objections and consists essentially in driving pegs or pins or equivalent elements from the outside of the unvulcanized rubber covering through the latter, and through the corresponding holes of the roll and finally into the roll, from which the pegs may be easily removed, leaving very perfect holes in the rubber, it being a feature of my invention to vulcanize the rubber while the pegs are in place in the rubber, the pegs acting as moulds to form holes with very smooth walls, such smoothness giving efficient passage of the material sucked through the holes.

A feature of my invention is the use of a template having perforations to correspond with the perforations in the roll.

Another feature of my invention is the use of a gauge similar to a caliper for locating the proper point on the outside of the rubber covering to correspond with the desired hole in the metal roll.

Other features will be pointed out below.

In the drawings:

Figure 1 is a partial plan of a form of apparatus for carrying out my invention;

Figure 2 is a section on line 2—2 of Figure 1;

Figure 3 is a section similar to that of Figure 2 but with the pegs driven in and the canvas covering applied;

Figure 4 is a section on line 4—4 of Figure 2;

Figure 5 is a modification described below; and

Figure 6 is another modification described below.

Roll 1, preferably of bronze, has a plurality of holes or perforations 2, located along and around the roll. It is desired to make holes through the rubber covering 3 which is applied to, and held to, the outside of the roll in any suitable way. In order to permit pegs or pins or equivalent elements 4 to be driven through the unvulcanized rubber covering and into the corresponding holes 2 in the metal roll I provide a template 5 which may have a flange 6 to be held to the end of the metal roll by screws such as 7. The template is provided with holes 8 corresponding exactly with the holes 2 in the metal roll so that when the template is in place its holes 8 will be in registry, each with a hole in the metal roll. A peg 4 is then driven from the outside through each hole 8 and through the unvulcanized rubber covering and into the corresponding hole 2 in the metal roll. When pegs have so been driven through all the holes of the template into the position of Figure 3 the template may be moved to another location around the circumference of the rubber covering and suitably fixed to the end of the metal roll and the flange 6, when desired, may be screwed to the other end of the metal roll. Holes 9 indicate holes in the rubber covering as they appear after the template has been moved. After the pegs are driven into substantially the position of Figure 3 canvas material 10 is wound spirally and overlapping outside the rubber covering and covering the pegs. Then vulcanizing is had of the rubber while the pegs are still in place and then the canvas is taken off and the pegs are driven clear through to the hollow inside of the metal roll and are easily removed therefrom in any suitable way.

In Figure 5 I show a gauge in the nature of a caliper having a boss 11 mounted on rollers 12 and having an arm 13 to enter within the roll 1A and an arm 14 to extend along outside of the rubber covering 3A. Arm 13 has a supporting portion 15 which has rollers 16 to run on the inside of the metal roll. Supporting portion 15 carries a member 17 with a beveled or rounded end to enter the desired hole 2A in the metal roll. Member 17 is pressed upward by spring 18 which may be conveniently put in place through transverse passages 19. The arm 13 may be moved along within the metal roll in order to permit member 17 to enter the desired hole 2A, the spring permitting member 17 to ride along the inner surface of the roll from one hole 2A to another. When member 17 engages any hole in the metal roll, the bore of bushing 20 carried by arm 14 will be in line with the hole so engaged and then the peg 4A may be driven through the unvulcanized rubber covering from the outside to form a hole in said covering in line with the selected hole 2A in the metal roll. The gauge may be moved longitudinally of the metal roll to permit the insertion of pegs 4A as desired and the metal roll may be rotated on rolls 21, only one being shown, like those in Figure 6 to bring desired holes 2A into position for engagement by member 17.

In Figure 6 I show an X-ray machine 22 having rollers 23 to run on tracks 24, the latter being mounted on support 25 which is free to retain its horizontal position even when the roll 1B and rubber covering 3B are rotated on rolls 26 and 27. A fluoroscope 28 is mounted on arm 29, the latter being fixed to carriage 30 having rollers 31. With this embodiment of the invention the light will show through a hole 2B and through the rubber covering whereupon a mark will be placed on the outside of the rubber covering, as at 32, and a peg such as 4 may be driven through the rubber covering from the outside at mark 32 and will be in line with the corresponding hole 2B. All of the markings like 32 may be made by rotating the roll and covering on rolls 26 and 27, by moving the machine 22 on its rollers and by moving the fluoroscope on rollers 31.

After the pegs have been driven into the unvulcanized rubber covering in the forms of Figures 5 and 6 the canvas covering may be applied and vulcanizing may be had as explained in connection with the form of Figures 1 to 4.

What I claim is:

1. The method of making a rubber-covered roll consisting in applying a rubber cover to a roll provided with holes, then throwing a light ray from the inside of the roll through one of the holes in the latter and through the rubber covering over said hole, and then forcing an element through the rubber covering from the outside of the latter at the point where said light appears.

2. The method of making a rubber-covered roll consisting in applying a rubber cover to a roll provided with holes, then throwing, by means of an X-ray machine within the roll cooperating with a fluoroscope outside of the rubber covering, a light ray from the inside of the roll through one of the holes of the latter and through the rubber covering over said hole, and then forcing an element through the rubber covering from the outside of the latter at the point where said light appears.

3. The method of making a suction rubber-covered roll consisting in applying an unvulcanized rubber cover to a roll provided with holes; and then applying to the outside of the rubber covering a template provided with holes corresponding with the holes in the roll and then inserting elements from the outside of the template through the template and rubber covering, while the latter is unvulcanized, to form holes in the latter corresponding with the holes in the roll; and then vulcanizing the rubber while said elements are in the holes in the rubber.

4. The method of making a suction rubber-covered roll consisting in applying an unvulcanized rubber cover to a roll provided with holes; then registering a part of a gauge member with the inner portion of a hole in the roll, said gauge member having a perforated portion at the outside of the rubber covering in line with said part, said part and said perforated portion being in line with each other at all times; then inserting an element through said perforated portion and through said rubber covering from the outside, while the rubber is unvulcanized; and then vulcanizing the rubber while said elements are in the holes in the rubber.

5. The method of making a suction rubber-covered roll consisting in applying an unvulcanized rubber cover to a roll provided with holes; then locating elements outside the cover in line, respectively, with said holes in the roll; then forming holes in the rubber cover to correspond with the holes in the roll by inserting said elements through the rubber cover from the outside while the rubber is unvulcanized, the rubber covering being forced toward the roll by said insertion; and then vulcanizing the rubber while said elements are in the holes in the rubber and while said elements hold the rubber forced toward the roll.

6. The method of making a suction rubber-covered roll consisting in applying an unvulcanized rubber cover to a bronze roll provided with holes; then locating elements outside the cover in line, respectively, with said holes in the roll; then forming holes in the rubber cover to correspond with the holes in the roll by inserting said elements through the rubber cover from the outside while the rubber is unvulcanized, the rubber covering being forced toward the roll by said insertion; and then vulcanizing the rubber while said elements are in the holes in the rubber and while said elements hold the rubber forced toward the roll.

7. The method of making a suction rubber-covered roll consisting in applying an unvulcanized rubber cover to a roll provided with holes; then registering a spring-pressed part of a gauge member with the inner portion of a hole in the roll, said gauge member having a perforated portion at the outside of the rubber covering in line with said part, said part and said perforated portion being in line with each other at all times; then inserting an element through said perforation and through said rubber cover from the outside while the rubber is unvulcanized; then moving the gauge member to a location such that the spring-pressed part will register with another hole in the roll, said spring-pressed part riding along the inner surface of the roll from one hole in the roll to said other hole during said movement of the gauge; then inserting an element through said perforated portion in its new location and through the rubber cover from the outside while the rubber cover is unvulcanized; and then vulcanizing the rubber while said elements are in the holes in the rubber.

SHERMAN B. WARD.